INVENTORS
ALLEN S. KENYON
ROBERT J. SLOCOMBE
BY
Mary B. Moshier
ATTORNEY

United States Patent Office 3,518,221
Patented June 30, 1970

3,518,221
REINFORCING FILLERS IN A MATRIX OF TWO THERMOSETTING RESINS
Allen S. Kenyon, Kirkwood, and Robert J. Slocombe, St. Louis, Mo., assignors to Monsanto Company, St. Louis, Mo., a corporation of Delaware
Filed Oct. 30, 1967, Ser. No. 679,268
Int. Cl. C08g *51/04;* C08k *1/02*
U.S. Cl. 260—37
14 Claims

ABSTRACT OF THE DISCLOSURE

A shaped composite product comprising a thermoset resin matrix and reinforcing filler particles distributed therein, said matrix comprising a layer of a first thermoset resin completely enveloping the filler particles and a second thermoset resin integral with said first resin and having a modulus of elasticity which is greater than that of said first resin; a solid molding composition wherein the resin enveloping said particles is thermosettable and the envelope particles are embedded in a second, more rigid, thermosettable resin; and the process of preparing the molding composition which comprises first coating said particles with said first thermosettable resin and then applying the second thermosettable resin to the coated particles.

BACKGROUND OF THE INVENTION

The invention herein described was made in the course of or under a contract or subcontract thereunder with the U.S. Department of Defense, Office of Naval Research.

Field of the invention

Thermoset, filler-reinforced resinous composites.

Background of the invention

In the fabrication of composites, primary attention has been devoted to adhesion of matrix to filler, and numerous coupling agents have been provided in attempts to improve adhesion. In the field of the thermoset composites, the organosilanes of dual functionality (see e.g., U.S. Pat. Nos. 3,252,825 and 2,763,629) and Werner complexes like methacrylatochromic chloride (see, e.g., U.S. 2,552,910 and 2,273,040), are commonly employed.

The prior art has been particularly concerned with continuous glass fiber, strand or rovings as reinforcing agents. Glass filaments in any form are readily abraded during manufacture and use; hence finishes or sizes are usually applied, e.g., to minimize friction between the filaments of a strand and physical damage in handling. Because presence of the size or finishing agent may prevent proper adhesion to matrix, attempts have been made to develop agents which not only perform the protective function but also serve to anchor the matrix resin to the glass filament. For example, in U.S. Pat. No. 2,931,739, continuous glass fiber is treated with a composition containing not only the silane coupler but also a saturated polyester resin, polyvinyl alcohol and polyvinyl pyrrolidone; and in the article by N. M. Trivisonno et al., Industrial and Engineering Chemistry, 50, 912–917 (1958), which is concerned with adhesion of polyester resin to treated glass surfaces, there are reported numerous finishing agents of polymeric type which improve the bonding strength between glass cloth and the polyester matrix resin in laminate preparation. Combinations of the phenolic-neoprene or vinyl resin-synthetic rubber types were found to improve adhesion more than any of the chemically bonding finishes, i.e., vinyltrichlorosilane, vinyltriethoxysilane, methacrylato- chromic chloride, and tolylene diisocyanate. In the U.S. Pat. No. 2,354,110, it is reported that polyvinyl butyral improves bonding when applied to fiber glass cloth as a precoating prior to applying phenol-aldehyde matrix resin. In U.S. Pat. No. 3,261,736, continuous glass fiber is sized with an aqueous dispersion of a vinyl polymer such as polyvinyl acetate or a butadiene-styrene rubber; the coated product is then used as reinforcement for polyester or epoxide resin matrices.

We have found that although the vinyl resins are good adhesives, there is very little, if any, improvement in physical properties when they are used to coat particulate fillers for thermoset systems. The term "particulate filler" as used herein refers to fine powder or short fibers or thin plates. The powders may be of any crystalline shape or they may be spherical, e.g., microbeads. The dimensions of the plates or fibers will not be comparable to the size of the test specimen as in the case of laminates made from cloth preprges or mechanically positioned long filaments; generally, the presently employed fibers will have a length of from, say 0.0000.1" to 0.5" and, preferably, up to about 0.3".

In particulate-filled systems, not only important is the adhesive bond between the different phases, but also the type of filler and the particle size and shape. Particularly significant is the fact that the elastic behavior of the particulate-filled systems differs from that of the system in which continuous lengths of fiber are used. Recently, very short fibers or whiskers possessing enormously high strengths, e.g., boron fiber or silicon nitride whiskers, have become available. Much effort has been expended at arriving at an optimum means for incorporation of these very thin materials into heat-resistant matrix resin systems, for the high pressures required to mold the resins are often conducive to fracture of the thin fibers. Proper utilization of the highly valuable properties of these materials requires that in the composite they be separated from each other by a layer of the matrix resin; in view of the propenisty of fine materials to aggregate, this has been hard to achieve. Also, it has been found that when short fibers of reinforcing material, including glass, are aligned in the matrix, they most effectively confer their strength characteristics to the matrix. However, such orientation has generally required tedious hand lay-up or use of prepregs, e.g., tapes or braids in which the fiber has been firmly positioned before molding.

Uniform dispersion in the matrix is, of course the goal for all types of particulate-filled systems. Aggregates are to be avoided: weak intra-bonding can be a flaw resulting in fracture of the composite. The individual filler particles should be separated from one another and wetted individually by the matrix phase. Agglomerates also tend to contain voids and air spaces, and unless they have appreciable mechanical strength so that they are not readily broken up, the filled material will be weakened thereby.

Generally, in particulate-filled systems, the filler is more rigid than the matrix. Even with perfect particle to matrix adhesion, when application of a strain or load does not result in fracture at the interface, fracture of the matrix and/or filler may occur. Particularly when there is good adhesion, the modulus of elasticity tends to increase upon addition of filler, and it has been observed that, generally, fillers cause substantial decrease in elongation to break. With the usually more flexible thermoplastic materials, these effects are not to be deplored and often they are desired. However, with the rigid, highly cured thermosetting matrices, shear strength may be too low to transfer the full load, with rupture occurring as shear failure.

It is thus obvious that provision of a particulate-reinforced thermoset composite having even adequate mechanical properties presents many pitfalls. Use of the thermosetting materials is complicated by the fact that reaction between prepolymer and curing agent is involved and thus usually requires use of prepregs or preforms in the final molding; so that, generally, fabrication of the composites is limited to compression molding. Flow molding is generally shunned because it is difficult thereby to provide for uniform distribution of the particulate-filler in the resin matrix and because of the high curing temperatures required.

The present invention overcomes many of the previously encountered obstacles. It provides for excellent adhesive bonding of filler to resin, for separation of the individual filler particles from each other by a layer of resin, reduces cracks and voids and makes possible favorable stress distribution. A significant advance in the art is thereby achieved.

SUMMARY OF THE INVENTION

An object of the invention is to provide an improved, particulate-reinforced thermoset composite. Another object is to provide a conveniently used, thermosettable, particulate-reinforced prepreg which can be compression molded or flow molded to give shaped objects having very good tensile strength and modulus.

These and other objects hereinafter disclosed are met by the invention wherein there are provided:

(1) A shaped composite product comprising a rigid thermoset resin matrix and reinforcing filler particles distributed therein, said matrix comprising a layer of a first thermoset resin composition completely enveloping the filler particles and a second thermoset resin integral with the first resin and having a modulus of elasticity which is greater than that of the first resin composition. The filler particles may be any finely comminuted material having reinforcing action, inorganic or organic, in granular, powder, plate or fiber form. The filler is completely enveloped in a thermoset resin composition having a modulus of elasticity which is less than that of the other resin component of the matrix. The thermoset resin may be any resin which is a liquid or a fusible solid until it has been hardened or cured, catalytically and/or thermally to the infusible stage, e.g., it may be completely cured epoxy, polyester, phenolic, amide, imide, amine, or urethane resin. The low-modulus thermoset resin composition may or may not contain a flexibilizing agent in order to confer to it the desired plasticity; or, it may be a thermoset resin which has been prepared from reactants which impart flexibility, e.g., aliphatic, long-chain reactants in case of the epoxy or polyester resins. Depending upon the properties desired in the composite, the coating of low-modulus resin may be of any thickness. However, to confer substantial improvement of composite properties it should have a thickness which is at least 2% of the smallest dimension of the reinforcing particle. Also, while all that is required is that the resin which immediately surrounds the filler particle be less regid than the other matrix resin, more significant results are obtained when the modulus of the first resin composition is from about 20% to 80% of the modulus of the second resin.

(2) A molding composition comprising (I) reinforcing filler particles enveloped in a first solid, thermosettable resin composition and (II) a second solid, thermosettable resin surrounding the enveloped particles and integral with the first resin composition, and said second resin having a modulus of elasticity, in the completely cured state, which is greater than that of the first resin in the completely cured state.

(3) The process of preparing a solid, curable molding composition which comprises depositing on reinforcing filler particles surfaces a first, solid thermosettable resin composition to completely enveolpe the filler particles with the resin composition and depositing upon the thus enveloped particles a second, solid thermosettable resin having, in the completely cured state, a modulus of elasticity which is greater than that of the first resin composition in the completely cured state. The resins may be applied as solutions, suspensions, or dispersions in a liquid; or they may be applied as fusible solids, e.g., in a fluid bed process. Preferably, in order to assure coating of the individual particles and to avoid agglomeration, the solid low-modulus, fusible resin is formed as it is being deposited on the particles. This is done, e.g., by stirring the particles, which may or may not have been pre-treated with a coupling or anchoring agent, in a solution of the normally liquid, or "A" stage thermosettable resin and, possibly, a flexibilizer or plasticizer, therefor, adding a curing agent which is known to react with the liquid resin, and continuing the stirring to advance the resin to the solid, fusible stage. The latter step may or may not require heating, depending upon the nature of the resin. The solvent which is employed in thus coating the particles with the low-modulus resin composition is preferably one in which the formed, solid, fusible resin is insoluble and which provides a hydrogen donor for catalyzing the reaction between the curing agent and the A-stage resin. Numerous binary or ternary mixtures of solvents are available for serving these purposes. After the solid, fusible resin has been deposited upon the filler particles with a solution of the curable, more rigid resin, now coated with what will be hereinafter referred to as the "innerlayer," are employed for embedding into the more rigid, solid, fusible resin. Although this may be done by simply mixing the coated particles with finely divided, solid moldable particles of the rigid resin and then compression molding and curing the dry mix, in order to assure uniform distribution of the filler in the composite, it is preferred to treat the innerlayer-coated particles with a solution of the curable, more rigid resin. Such a solution, hereinafter referred to as the "protomatrix solution" is prepared by reacting a normally liquid thermosettable resin with a curing agent therefor in a liquid media which serves as solvent for the advanced resin and which may include components that are solvents for the liquid resin but nonsolvents for the advanced resin. The latter solvent components can be removed by distillation to give as residue a concentrated protomatrix solution having improved stability. The protomatrix solution may be diluted to any concentration, depending upon the quantity of the more rigid matrix resin which it is desired to incorporate into the composite.

An especially valuable, moldable composition is obtained by slurrying granules of the inner layer-coated particles in a solvent for the protomatrix resin, gradually stirring into said slurry a dilute solution of the protomatrix resin and coagulating the protomatrix resin upon the innerlayer-coated filler by contacting the mixture with a liquid in which the protomatrix resin is insoluble and with which the solvent is miscible. Depending upon the size and shape of the coated particles, the volumes of materials that are involved, suspending or dispersing agents or means, e.g., small concentrations of a polyelectrolyte, or ultrasonics, may be used at this point for maintenance of discrete particles. The granular molding composition, comprising flowable grains of an individual filler particle completely encased in a first coating of the solid, curable low-modulus resinous composition and second, outer coating of the soild, curable rigid resin is recovered by filtering or decanting and drying at a temperature which is insufficient to cure the resins to the infusible stage.

The protomatrix solution may also be used with the innerlayer-coated particles to form larger prepregs or preforms. Thus, a solution of the protomatrix resin may be mixed with such particles and spread into a film or sheet which, upon air-drying is readily crushed or cut into small pieces suitable for molding. Alternatively, a dilute solution of the protomatrix resin may be used to impregnate a preform obtained by reacting the innerlayer components (liquid thermosettable resin, a curing agent therefor, and if needed, a flexibilzer) with the slurried filler in a thin mold and drying under conditions insufficient to effect complete cure of the resin. The impregnated preform is then air-dried and heat-cured.

DESCRIPTION OF THE PREFERRED EMBODIMENTS

Figure 1:
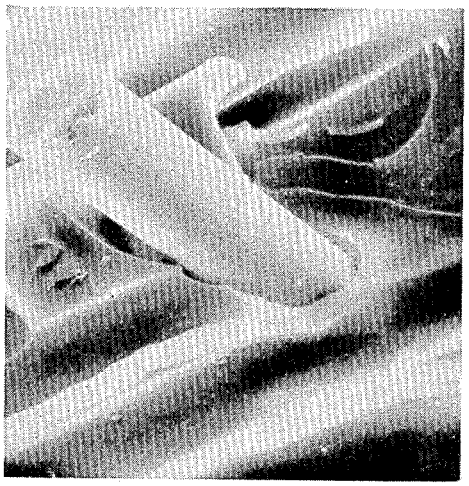
FIG. 1 is a photomicrograph (2,000 ×) of the tensile fracture surface of a discontinuous glass fiber-reinforced epoxy resin composite showing cracking between fiber and resin.

The preferred composite comprises a thermoset resin matrix and inorganic, reinforcing filler particles distributed therein, said matrix comprising a layer of a first thermoset resin completely enveloping the filler particles and a second thermoset resin integral with said first resin and having a modulus of elasticity that is greater than that of said first resin.

As herein employed, the term "epoxide resin" includes any resinous material containing the grouping

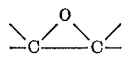

As is well known in the art, the normally liquid A stage epoxide resins are generally prepared by reacting polyhydroxy compounds with chlorohydrins and/or polyepoxides or mixtures thereof. Examples of commonly available epoxy resins are those made from epichlorohydrin and such polyhydroxy compounds as 4,4'-isopropylidenediphenol, resorcinol, ethylene glycol, phenolaldehyde precondensates such as the novolaks, etc. Examples of presently useful resins which are commercially available are the "Epons" which are manufactured by Shell Chemical Company and the "Araldites" which are manufactured by Ciba Company. Generally, the preferred epoxides are those of the general formula

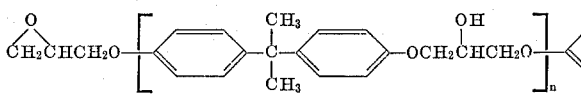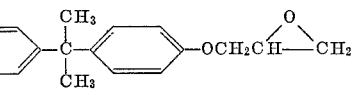

wherein $n$ denotes the degree of polymerization. A commercially available resin of the above formula, for example, is Epon–815, having an average molecular weight of about 330. Other resins of the above general formula are, e.g., Epon–826 and Epon–828. These differ from each other with respect to molecular weight and epoxide equivalent; Epon–815 has an epoxide equivalent of 175–195, whereas that of Epon–826 is 180–188. An important difference between Epon–815 and Epon–826 is that the former contains monofunctional epoxy diluents to give low viscosity, whereas the latter appears to be an undiluted resin with a near-theoretical epoxide equivalent. The epoxy resins are generally characterized by the term "Epoxide equivalent weight," which term indicates the weight in grams of the resin that is equivalent to one gram molecular weight of the epoxide group. This enables easy calculation of the amount of curing agent required by that particular resin to cure it to an infusible stage. Suitable for the present purpose, in addition to the above-described epons, are, e.g., Epon–834, or –1001 or –1031 or –1064 and Araldite–1064 or –6020. Such materials are generally liquids at temperatures of from about 9–80° C. and are in the A-stage of polymerization.

In order to advance the polymerization to the B stage, whereby the A-stage resins become fusible solids, the A-stage resins are reacted with a curing agent under conditions of time and temperature which are insufficient to give complete cure. This agent may be any material which reacts by cross-linking with the polyepoxides, e.g., the polycarboxylic acids and anhydrides, polyamines, polymercaptans, boron trifluoride complexes, hydrazides, polyamides, low molecular weight phenol-formaldehyde, urea-formaldehyde or melamine - formaldehyde resins, etc. Particularly preferred are compounds containing a plurality of amino hydrogen atoms, e.g., diethylenetriamine, triethylene tetramine, melamine, dicyandiamide, m-phenylenediamine, 4,4'-methylenedianiline, diaminodiphenyl sulfone, etc. In the present process, the A-stage epoxide is advantageously employed in a quantity which is at least 1.1 times the chemical equivalent amount of the curing agent. By "chemical equivalent amount" is meant the quantity of epoxide needed to furnish one epoxy group per each primary or secondary amino group of the curing agent.

For some purposes, in order to obtain products meeting certain specifications, it may be desirable to use a mixture of two or more liquid epoxide resins and/or a mixture of two or more curing agents.

All that is required is that the resin which immediately surrounds the filler particle be less rigid than the outerlayer of matrix resin; i.e., the innerlayer resin must have a modulus of elasticity which is lower than that in which the innerlayer-coated filler is embedded. Generally, the modulus of the innerlayer thermoset will be from about 20% to 80% and, prefereably, from 40% to 60% of that of the outerlayer of matrix resin. However, within the spirit of the invention, and difference in the moduli, so long as that of the innerlayer is less than that of the outerlayer of matrix resin, will give improved results. The coating of low-modulus resin may be of any thickness. Generally, however, the low-modulus resin coating will have a thickness of, say, from about 2% to 50% and, preferably, from 5% to 40% of the smallest dimension of the filler particle. The amount of rigid resin will depend, of course, upon the volume fraction of filler which it is desired to have present in the composite, upon the nature of the filler and of the two resins, and upon the mechanical properties required of the composite. It is well known that some fillers pack more readily than others, and that the thermoset resins often differ from each other with respect to loading capacity. Generally, filler loadings will be from, say, from 5% to 90% and, preferably, from 15% to 80% by volume, of the composite.

The presence of the more flexible, i.e., less rigid, innerlayer exerts an influence which extends substantially beyond the innerlayer thickness. The modulus of a reinforced composite is not merely an average of the matrix and reinforcement moduli; neither is the modulus of the nonfiller phase of the composite a mere average of the moduli of the two different resins which make up such nonfiller phase.

Figure 2:
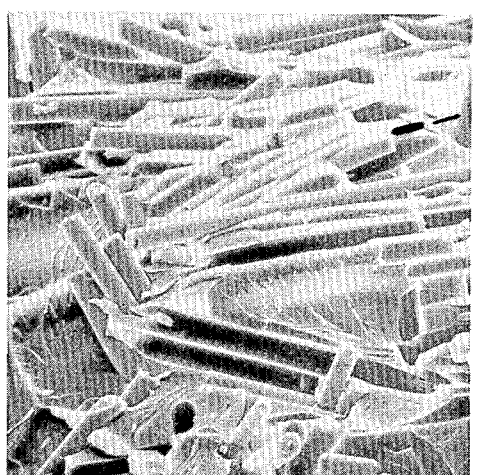
FIG. 2 is a photomicrograph in lower magnification (460 ×) of the tensile fracture surface of the composite of FIG. 1 showing mold marks where fibers have been removed.
Figure 3:
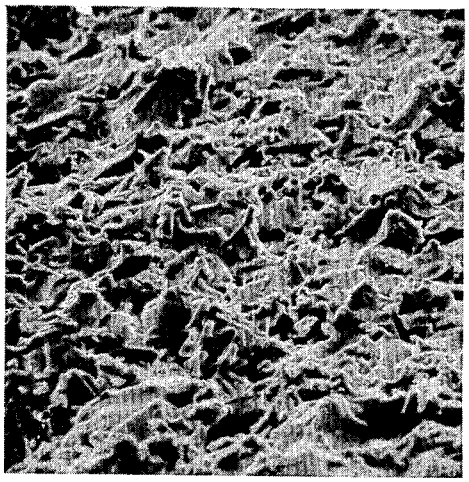
FIG. 3 is a photomicrograph (180 ×) of the tensile fracture surface of a composite wherein the discontinuous glass fiber reinforcement is separated from a rigid epoxy resin matrix by a flexible layer of epoxy resin. Fractured fiber is seen.
Figure 4:
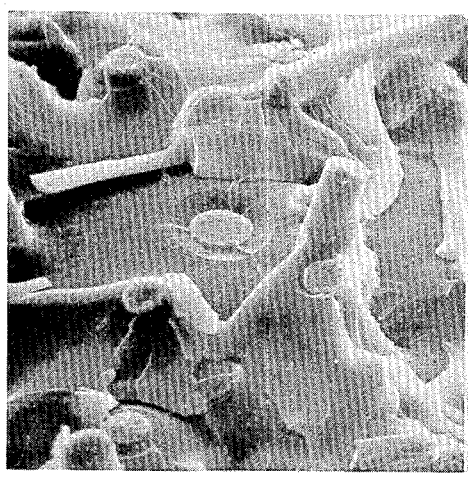
FIG. 4 is a photomicrograph in higher magnification (900×) of the tensile fracture surface of the composite of FIG. 3, showing a circular pit, or "zone of influence," surrounding the fractured fiber.
Figure 5:
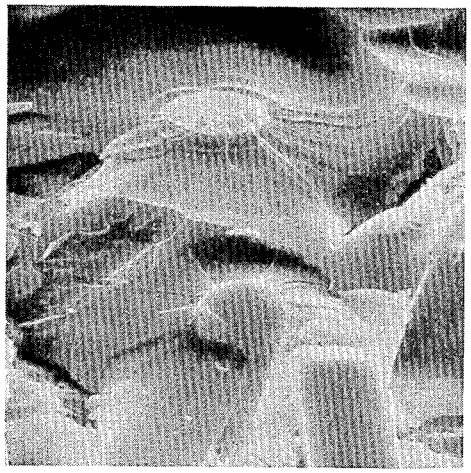
FIG. 5 is a photomicrograph in still greater magnification (1,800 ×) of the tensile fracture surface of the composite of FIG. 3, showing the fractured fiber end at the top of a mound, or "zone of influence" of adhering resin.

A vital part of any investigation of fracture mechanics of any material of construction is the study of fracture surfaces. Employing the scanning electron microscope, fractographs clearly show substantial effects resulting from the presence of a flexible innerlayer of resin surrounding the filler. A Cambridge "Stereoscan" Scanning Electron Microscope, Mark II, manufactured by Cambridge Instrument Company, Ltd., Cambridge, England, was used for the studies. The drawings, FIGS. 1-5, are photomicrographs obtained therewith. Investigations were made of tensile fracture surfaces of epoxy matrix composites reinforced with various particulate fillers, in presence or absence of the innerlayer resin. Generally, when no innerlayer was present, failure occurred at (or indistinguishably near) the matrix-reinforcement interface over a significant portion of the fracture surface. This is shown in FIG. 1 of the drawings. Such interfacial failure was characterized by a fracture surface containing a large number of exposed, denuded fibers in the fiber-reinforced composites, as shown in FIG. 2. Also, FIG. 2 shows "mold" marks in the matrix from which fibers had been removed without causing cohesive matrix failure; these "molds" reproduce, in detail, the topography of the fiber surfaces, said surfaces being imprinted in the matrix. In composites comprising the innerlayer resin, the tensile fracture surfaces were characterized by the absence of extensive interfacial failures, and the surfaces displayed very little unfractured filler. This is shown in FIG. 3. The exposed portions of fibers were short and often had resin adhering to them. As shown in FIG. 4, fractured fibers were clearly evident in such specimens, and surrounding each exposed fiber end there was a clearly defined area which differed from the remaining resinous material. This area was a circular pit, from the center of which the fiber end protruded in such a manner that some of the resin from which it protruded still clung to it. Thus a concave area surrounded the fiber. In other instances reciprocals of such areas were seen; thus, as shown in FIG. 5, the fiber end was the apex of a mound, with resin extending radially and downwardly from the edge of the fiber end to define a zone which differed from the remaining resinous materials. Similar phenomena were observed with glass microbeads. Such differences are believed to be demonstrations of the innerlayer effects. Because the area throughout which the difference is demonstrated is well outside the area encompassed by the innerlayer, it is a zone of influence rather than of physical presence. The width of this zone, as well as the frequency of its occurrence appears to increase with increasingly good mechanical properties of the composite; hence, the area encompassed by this "zone of influence" appears to be a measure of the value of the flexible innerlayer.

As herein disclosed, the flexible innerlayer may be any thermoset resin which has a modulus of elasticity less than that of the thermoset resin in which the innerlayer-coated particle is embedded. Within the various classes of thermoset materials, there is sufficient variation in the modulus to make an easy choice possible. Generally, the more aliphatic the resin, the lower the modulus. Aromaticity contributes to thermal resistance, however; so that for production of composites suitable for space applications, resins containing some aromatic linkages are preferred. Although a balance between heat-stability and flexibility can be obtained by proper tailoring of the molecule, in the art it has been found convenient to effect such a balance by using a flexibilizer or a plasticizer for the heat-stable resin.

Flexibilizers for epoxide resins are conventional; examples thereof include epoxidized glycerine with 2 to 3 epoxy groups per mole, the "Versamides," which are higher fatty acid amides provides by General Mills, Inc., polyethylene sulfide, Cardolite NC-513 which is an epoxidized cashew nut oil produced by Minnesota Mining and Manufacturing Company, and the polyether amines of the formula $H_2N-(R-O-R)_nNH_2$ produced by the same company, and Thiokol Chemical Corporation's EM-207, a polyester having an average molecular weight of 1508, and having 2 carboxy radicals per molecule attached to a chain of the formula

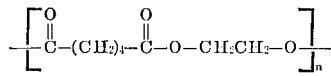

wherein $n$ denotes the degree of polymerization. The quantity of flexibilizer per epoxide resin will vary, of course, with the nature of the epoxide and the decrease in modulus which it is desired to impart to the epoxide resin. A saturated polyester of the above formula is preferred.

Instead of employing a flexibilizer, there may be used flexible epoxy resins such as those produced by reaction of epichlorohydrin with an aliphatic diol or polyether diol, e.g., a compound of the formula

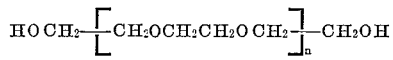

obtained by polymerization of ethylene oxide. Also, instead of employing an epoxy resin having a long aliphatic chain, flexibility in the innerlayer resin can be produced by using a polyamine curing agent having greater freedom of rotation in its molecular structure. Aliphatic diamines such as 1,4-tetramethylenediamine or 1,6-hexamethylenediamine may be used to give more flexibility in the resin than does phenylenediamine or methylenedianiline. An advantage of introducing flexibility by this means is that the flexible components are tied into the structure with strong covalent bonds.

Instead of employing an epoxide resin in both the innerlayer and the outerlayer of the matrix, there may be used two different thermoset resins. For example, the innerlayer may be a flexible long-chain phenolic resin and the matrix outerlayer may be a more rigid epoxide resin. Also, instead of employing the epoxides, either the innerlayer or the outerlayer or both may be another type of thermoset resin, e.g., an unsaturated polyester resin cross-linked with an olefinic compound. Examples of such other resins include the reaction product of an alpha,beta-unsaturated acid or anhydride such as fumaric acid or maleic anhydride or a mixture of such an unsaturated acid compound and a saturated polycarboxy compound such as adipic acid or phthalic anhydride. See, for example, the book, "Unsaturated Polyesters, Structures and Properties," by H. V. Boenig, New York, Elsevier Publishing Company, 1964. The unsaturated polyesters dissolve easily in styrene or other vinyl compounds, e.g., vinyl acetate or ethyl acrylate to give syrups which polymerize in the presence of a free radical liberating agent to give first a solid fusible resin which, upon heating at increased temperature, is changed to a solid infusible product.

Other thermoset resins which are presently useful are the phenol-formaldehyde, phenol-furfural, xylenol-formaldehyde, urea-formaldehyde, the rigid polyurethanes, the polyimides, etc.

The particulate filler of the present composites may be inorganic or organic and of any shape; however, because of current interest in fiber-reinforced composites, at present the value of the invention is probably most pronounced when related to the non-continuous inorganic fibers. Such fibers will be from, say 0.00001″ to 0.5″ and, preferably, of from 0.03″ to 0.3″ in length. The fibers will have an aspect ratio from about 50 to 1500, although, depending upon the nature of the fiber and of the resins used therewith, the fiber diameter may be somewhat lower or higher than that required by such a range. In selecting the most suitable ratio within these limits it is advantageous to consider the stiffness of the contemplated reinforcing fiber, since materials of high flexibility should be thick enough to maintain a degree of rigidity during processing. Likewise, materials of great rigidity should be thin enough to permit easy distribution.

Selection of the proper aspect ratio for each fiber is a matter of routine experimentation.

Glass fiber, being readily available and imparting very good tensile and flexural properties to composite structures, is generally useful. However, from the standpoint of simultaneous mechanical strength and thermal resistance, particularly useful are the inorganic refractory materials, e.g., filaments, fibers or whiskers of boron, graphite, niobium, tantalum, hafnium, tungsten, molybdenum, bronze, copper, lead, silver, stainless steel, silica, silicon carbide, silicon nitride, boron nitride, alumina, sapphire, zirconia, titania, etc. Any of the high-strength fibers listed in the table at page 134 of the book "Fiber Composite Materials," published by the American Society for Metals, Metals Park, Ohio, 1965, is presently useful. Naturally occurring fibers such as the asbestos, hemp and bamboo fibers, and synthetic, high strength organic fibers such as the polypropylene, the polyester and polyamide fibers cut or chopped to the very short lengths may also be used.

The invention is also of significant utility in that it provides tough composites for use as electricity conductors, radiation shields or thermal or electrical insulators, depending upon the nature of the filler; i.e., the filler may be a fiber or powder or small grain or platelet of graphite or carbon or of any of the inorganic or organic, natural or synetheic materials disclosed above.

The preferred method of preparing the presently provided composites is first to apply the innerlayer coating and then to deposit thereon a coating of the outerlayer matrix resin. Previous to application of the innerlayer, the particulate filler may or may not be treated with a coupling agent, depending upon the nature of the filler and of the innerlayer resin composition. Advantageously, the innerlayer is applied by partially curing the normally liquid, "A" stage resin in presence of the filler, while at the same time providing for deposition of the solid, fusible resin on individual particles and minimizing agglomeration. We have found that this can be readily accomplished by stirring the particulate filler with a solution of a thermosettable resin composition in a solvent which provides a hydrogen donor, adding to the stirred mixture a curing agent for the said resin, continuing the stirring to promote deposition of solid, incompletely cured resin on the filler particles, and separating the thus-coated particles from the reaction mixture. Heating may or may not be employed. Because the choice of solvent will depend upon the nature of the resin composition, it will be obvious that any number of solvents could be useful. In many instances, a single liquid will be satisfactory. This is particularly true with the nonfibrous filler systems. When the filler is a fiber, operation is generally improved by including in the solvent phase a liquid which facilitates slurrying. Water is a convenient medium for this purpose, and is frequently a component of binary or ternary solvent systems including liquids having the desired solubilizing property. For example, there may be used with some of the resins, a mixed solvent consisting of water, a lower alcohol such as methanol, and a higher ketone such as 3-pentanone or a lower aromatic hydrocarbon such as benzene. With others, there may be used a mixture of water, a lower alcohol such as methanol or ethanol and a lower ketone such as acetone. Water or the alcohols provide the hydrogen donor which catalyzes the reaction between the thermosettable resin and the curing agent. In order to obtain meaningful data for purposes of comparison, in the working examples which follow, the same innerlayer resin components, the same curing agent, and the same solvent mixture have been used. As shown therein, a ternary solvent consisting of water, methanol and acetone is a good solvent; however, it will be understood by those skilled in the art that a variety of solvents are available and that selection of a suitable solvent for the particular resin system is simply a matter of routine.

The ratio of solvent to resin components and to filler is not critical, so long as the reaction mixture is dilute enough to permit stirring and to meet the solubility requirements for homogeneity. Generally, the concentration of the total resin components in the solution will be from, say, about 2% to 50% and, preferably from 5% to 30% by weight. When the filler is fibrous, the quantity of filler particles will usually vary from 0.1% to 10% and, preferably from 1% to 5% of the weight of the solution. Much higher loadings, say to 30% or more, may be used with particulate mineral reinforcements, where agglomeration is rarely a problem.

As is known in the art, bonding of resin to filler is often facilitated by use of a coupling or anchoring agent. Such an agent is usually a bifunctional compound having a reactive group which reacts or becomes otherwise attached, e.g., by hydrogen bonding, to the filler, and another reactive group which reacts with, or is somehow attached to, the resin matrix. With some fillers, a coupling agent serves no purpose and may even hinder bonding; with others, a bonding agent is recommended. In practice, glass fibers are generally coated with a protective coating immediately upon spinning. Such coatings may prevent satisfactory resin-to-glass bonding, and cleaning of the fiber by heating it to burn off the coating, or washing the fiber with a solvent for the coating, is frequently employed. In other instances, the glass fiber, as received, is simply treated with a material which is known to facilitate bonding. For purposes of comparison, in the working examples which follow, all of the glass filler was first washed, e.g., with acetone, and in most of the examples γ-aminopropyltriethoxysilane was used as coupling agent. This is a readily available commercial agent of the family of silane couplers. Other aminoalkylalkoxysilanes which may be used are those which are disclosed in U.S. Pat. Nos. 2,832,754 and 2,930,809. Although these couplers or any of the silane couplers are of most present interest, other coupling agents are likewise useful, e.g., the Werner type complex compounds such as methacrylatochromic chloride or other compounds of this type described in U.S. Pat. No. 2,552,910. However, use of a coupling agent with a particular filler or a particular thermosettable resin forms not critical feature of this invention. The art well recognizes the bonding propensity of the various thermosetting resins with the various reinforcing fibers, numerous coupling agents are available, and it involves only routine experimentation to determine wether a coupling agent is necessary to obtain the coated filler and to select a suitable one if coating does not occur under the otherwise necessary conditions.

After removing the liquid phase, the innerlayer-coated particles may be washed and allowed to dry at a temperature below that at which the resin is cured to the infusible stage. Conveniently, the coated particles may be maintained as a slurry in a nonsolvent; the slurry is then used, if desired, for deposition of the outerlayer matrix resin.

To prepare the molding composition there is preferably used a solution of a partially cured thermosettable resin. Such a solution, herein designated as the protomatrix" solution, is described and claimed in the copending application of Robert J. Slocombe, Ser. No. 678,181, filed Oct. 26, 1967. Briefly, it is prepared by mixing together a solution of a liquid, A-stage thermosettable resin in a solvent (I) which is a solvent for not only the said A-stage resin but also for its partially cured, B-stage product and which boils above the temperature at which advancement of the A-stage resin to its B-stage occurs, with a solution of a curing agent for said resin in a solvent (II) which, in admixture with solvent (I), dissolves said B-stage product and which boils at a temperature which is below the boiling point of solvent (I) and below the temperature at which the liquid resin is cured; and distilling said solvent (II) from the resulting mixture to obtain as residue a solution of said B-stage resin. Here again, the nature of the thermosettable resin will determine the choice of solvent (I). Most B-stage thermo-settable resins require a solvent other than water, a lower alcohol or ether; and, although benzene or toluene or the lower, aliphatic ketones such as acetone are usually good solvents for these partially cured materials, they may not possess boiling points sufficiently high to permit advancing the resin to the B-stage during the time that solvent (II) is being volatilized from the reaction mixture. Because cure is determined by both time and temperature, it will be obvious to extend the reaction time when such low boiling materials are used by simply employing them in greater quantities. More expediently, the higher boiling aromatic hydrocarbons, e.g., xylene or ethyl benzene, are useful as solvent (I), especially when the resin is partially aromatic. When it is essentially aliphatic, lower boiling solvents will be found useful; on the other hand, when the resin is highly aromatic, as in the case of the polybenzimidazoles, the polybenzoxazoles and aromatic polyimides, solvents such as dimethylacetamide, dimethylformamide, 1,4-dimethyl-2-pyrrolidone, hexamethylphosphoramide and the like will be employed. In the working examples which follow, solvent (I) is xylene and solvent (II) is a mixture of water and methanol. The same solvents are used with the same resin components in the working examples, thereby to reduced variables and to produce useful data for overall evaluation. Generally, it will be found that inclusion of water or an alcohol or some other solvent which provides a hydrogen donor is advantageous in catalyzing the rection between the thermosettable resin and the curing agent.

The proportion of A-stage epoxide resin to the curing agent will be at least 1.1 times the chemical equivalent amount of the amine; preferably, there will be employed from, say, 1.3 to 2.0 chemical equivalent amounts of the epoxide per chemical equivalent of the amine. The concentration of the reactants in their respective solvents is immaterial so long as a readily distillable mixture results. However, in order to obtain a homogeneous solution of the liquid resin and the curing agent, it is necessary to use concentrations of liquid resin in solvent (I) that fall within the solubility limitations of the resin. A concentration of curing agent in solvent (II) which is similarly restricted can be readily determined by one skilled in the art of formulating solvent mixtures. For reaction of the epoxide with the curing agent, the hydrogen donor component is recommended for advancing the cure at a moderate temperature within a reasonable time.

It will often be found that the residue remaining after all of solvent (II) has been removed is a very thick syrup, because a large portion of solvent (I) vaporizes during the removal of solvent (II). In such a case, the thick syrup is diluted for storage or for immediate use. Dilution to, say, about 10% to 60% and, preferably, to 25% to 50%, inhibits advancement of the resin to the thermoset, infusible C-stage. Any solvent for the partially cured resin that is not a hydrogen donor may be used, e.g., acetone, 2-butanone, xylene, etc.

In preparing a granular molding composition wherein filler parts are coated with an inner layer of a solid, partally cured thermosetting resin and an outer layer of another, more rigid resin in the solid, partially cured stage, the innerlayer-coated filler is mixed with the protomatrix solution which has been diluted as stated above. Alternately, contact of the said coated filler may be effected by not allowing the innerlayer coating to dry before slurrying it in the solvent for the protomatrix resin and then gradually adding the concentrated solution of the protomatrix resin to the slurry to give the desired resin content in the mixture. However, any means of contacting the filler granules with the protomatrix solution suffices, so long as the granules are thoroughly wetted by the solution. Vigorous stirring is unnecessary, and generally should be avoided to guard against agglomeration. The resulting slurry is then treated to facilitate recovery of product. This may be done in some cases by rapid cooling or by addition of a non-solvent. However, possible agglomeration is more readily avoided and a more uniform, granular product is obtained by gradually adding the mixture, with stirring, into a solvent-miscible liquid which is a non-solvent for the resin, e.g., water or methanol. Advantageously, said liquid will contain a suspending agent, e.g., a polyelectrolyte such as polyacrylic acid, a partially hydrolyzed polyvinyl acetate, or acrylic acid-alkyl acrylate copolymer. The suspending agent is used in very small concentration, e.g., from about 0.05% to 0.15% by weight of said liquid. Upon filtering or decanting and drying the solids at a temperature which is insufficient to advance the resin to the infusible stage, there are obtained granules which are useful molding compositions, e.g., for compression or transfer molding. Because the filler is completely inclosed by the two layers of resin, the present process can be particularly useful for the production of fiber-reinforced composites by extrusion molding. The discrete granules, having no frayed, raw ends of exposed fiber to act as stress concentrators, as in the case of chopped prepregs, may be readily extruded through a constricted orifice heated to a temperature at which incomplete cure is effected when the extrudate is to be used as a prepreg.

As herein disclosed, the innerlayer-coated granules may also be slurried with the dilute protomatrix solution and the resulting slurry dried to give preforms for final moldings. Also, dispersions of the innerlayer-coated granules in the protomatrix solution may be cast into films which may then be cut into small pieces for molding by conventional means.

The invention is further illustrated by, but not limited to, the following examples.

EXAMPLE 1

Silane treatment of glass fiber

Glass fiber (20-end roving, Ferro Corporation, Type 1014, chopped into ⅟₃₂" lengths) was treated with a silane coupling agent as follows: a 3-liter flask was fitted with a stirrer, electric heating mantle, reflux condenser and thermometer, and charged with 30 g. of the chopped glass fiber and 2500 ml. of acetone. After stirring 10 minutes for washing, the acetone was removed by suction with a filter stick, and replaced by a solution of 0.09 g. of γ-aminopropyltriethoxysilane in 2500 ml. water. The slurry was stirred gently to avoid balling the fibers, heated to 70° C., and held at this temperature for 10 minutes. After the water was removed by the filter stick, the fibers were washed twice with one-liter portions of acetone.

Deposition of innerlayer resin on fibers

A quantity of innerlayer solvent was prepared by mixing 3200 ml. methanol, 1200 ml. acetone and 360 ml. water. The innerlayer resin solution was prepared by mixing 115 g. Epon–815 resin and 115 g. EM–207 resin with 2300 ml. of the innerlayer solvent. The remainder of the innerlayer solvent was used to rinse 30 g. of the above silane-treated fibers in the silane-treating assembly. The innerlayer resin solution was then added to said assembly, and the resulting mixture was warmed to about 40° C. while stirring gently. Triethylenetetramine (28.75 g.) was then added, the whole was brought to reflux (64° C.) and refluxing, with stirring, was continued for 2 hours. Liquid material was removed from the resulting reaction mixture by filter stick suction, and the residual granules of coated fiber were rinsed with acetone and used for deposition of outerlayer resin.

Preparation of outerlayer protomatrix resin

Solution I was prepared by dissolving 249.0 g. Epon in 355.0 g. xylene. Solution II was prepared by dissolving 76.0 g. 4,4'-methylenedianiline in a mixture of 817.5 g.

methanol and 114.0 g. water. To produce the protomatrix resin, a 1-neck, 3-liter flask fitted with a reflux condenser attached through a Y-adapter was charged with 966.2 g. of solution II, which was then heated to reflux with stirring; and 579.8 g. of solution I was rapidly added thereto from a dropping funnel at the Y-adapter. The whole was quickly brought to reflux; and after refluxing for 10 minutes, it was concentrated to a thick syrup during about the next hour. Analytical specimens taken at the end of reflux and end of evaporation showed that the oxirane oxygen content of the mixture had decreased from 6.62 milliequivalents to 2.79 and the oxirane/amine ratio from 1.66 to 1.33. The thick syrup, from which the methanol and water and most of the xylene had been vaporized, was determined to contain 0.942 g. of resin components per gram of syrup; and the 324 g. of product (containing 305 g. resin components and 19 g. solvent) was diluted with 286 g. acetone to give a protomatrix solution containing 50% solids. This solution was determined to have an oxirane oxygen content of 1.48 milliequivalents per gram of solution. It could be stored at room temperature (25° C.) without substantial change: at the end of 5 days the oxirane oxygen content was 1.35, at the end of 12 days it was 1.31 and at the end of 26 days it was 1.15 milliquivalents. The corresponding values upon storage at 5° C. were 1.41, 1.39 and 1.36 milliequivalents, per gram of solution.

Deposition of outerlayer resin on granules

A portion (30 g.) of the above freshly prepared 50% solids solution of protomatrix resin was added, dropwise, to a thick slurry of 77 g. acetone and 15 g. of glass fiber which had been treated first with the silane coupler and then with the innerlayer resin as described above. During the addition, gentle mixing was employed, using a lifting motion to avoid balling the fibers. The resulting mixture was precipitated in granular form by gradually adding it, with moderate stirring, to 3 liters of an 0.17% aqueous solution of a 96/4 weight ratio acrylic acid/2-ethylhexyl acrylate copolymer (suspending agent) at a temperature of 0° to 5° C. The resulting suspension was diluted with ice water, the water was siphoned off, and the residue was washed twice with ice cold water to remove acetone and suspending agent. After draining off the water, the product was dried in a vacuum oven overnight at room temperature to give hard, discreet granules.

Molding and curing the granules

Into a positive pressure mold having a 2" x 6" cavity which had been coated with a fluorocarbon release agent, there were charged 23 g. of the dried granules which were obtained as described above. Molding was conducted by gradually heating from 25° C. at 1200 p.s.i. to 150°–160° C. at 5000 p.s.i. and holding under the latter conditions for 15 minutes. The maximum pressure was maintained on the mold while it was cooled to below 60° C. Curing was completed by heating for 3 hours at 150° C., followed by 3 hours at 80° C. Strips (¾" x 6") were cut from the molding and evaluated on the Instron machine with an extensometer. The following results were obtained:

Tensile strength—24,600 p.s.i.
Modulus of elasticity—2,730,000 p.s.i.
Elongation—1.35%
Specific tensile strength—376,000 p.s.i.
Specific modulus—41,800,000 p.s.i.

The molded specimen had a 47.1% content of glass fiber, as determined by ignition.

That the presence of the inner, flexible layer of resin in the granule had substantial effect on the characteristics of the molded product obtained therefrom was ascertained by an experiment in which all of the above steps except the innerlayer coating step were repeated; i.e., instead of treating the silane-coated glass fibers with the solution of inner layer resin, said fibers were used directly with the 50% solution of protomatrix resin. The molded product obtained therefrom had the following properties:

Tensile strength—15,600 p.s.i.
Modulus of elasticity—2,100,000 p.s.i.
Elongation—1.0%
Specific tensile strength—258,000 p.s.i.
Specific modulus—34,700,000 p.s.i.

The composite which had been obtained from fiibers upon which the innerlayer had been deposited was thus found to be superior with respect to all of the above-tested properties.

Phase contrast microscopy (Bausch and Lomb, 21 × objective and 10 × eyepiece) of the innerlayer-coated fibers, previous to deposition of the outer layer, showed rounded deposits of resin on the fiber ends. Because sharp edges on fiber ends can cause high stress concentrations, the reduction of fiber end-effects by the innerlayer coating probably contriubes significantly to improved performance of the presently provided composites. Photomicrograps show a uniform coating of the flexible resin completely enveloping a single fiber; each fiber thus remains a highly individualized entity. Loss on ignition of a single, innerlayer coated grain supports this.

A scanning electron microscope study of both molded specimens was made. The tensile fracture surface of the specimen obtained without use of the innerlayer showed interfacial cracks between fiber and resin and unfractured fiber, as shown in FIG. 1 of the drawings. On the other hand, the tensile fracture surface of the innerlayer-containing composite showed fractured fiber at the center of a depressed zone of influence with matrix adhering to the exposed portion of the fiber, as shown in FIG. 4.

EXAMPLE 2

In order to study the mechanism involved in deposition of the innerlayer and the effect of temperature and time on the quantity of resin deposited, the following experiments were conducted.

The glass fibers described in Example 1 were treated with the silane coupler, washed and stirred in the innerlayer solution, and triethylenetetramine was added as in that example. At that point a sample of the fibers was removed from the mixture. The mixture was then brought to reflux, and refluxing was continued, during which time additional samples of the fibers were removed from the refluxing mixture. In the table which follows, zero hours denotes the first sample; the other samples were withdrawn after the indicated time had elapsed subsequent to removal of the first sample. The ash content of the samples was found to be as follows:

| Time, hours: | Ash content, percent |
|---|---|
| 0.00 | 99.89 |
| 0.25 | 93.06 |
| 0.50 | 92.59 |
| 1.00 | 91.52 |
| 1.50 | 92.26 |
| 2.00 | 89.26 |
| 2.50 | 87.30 |
| 3.00 | 83.69 |

The above experiment was then repeated, except that it was conducted at room temperature throughout. In this case, 2.5 hours after addition of triethylenetetramine, the ash content was 91.17; at the end of 3 hours, it was 89.58. This shows that, although more resin deposition is obtained at the refluxing temperature, longer reaction time permits operating at room temperature.

EXAMPLE 3

This example is substantially like Example 1, except that the fibers were not treated with the silane coupler; instead, they were simply washed with acetone and then submitted first to the innerlayer and then to the outerlayer treatments. Molding of the resulting dried product as in Example 1 gave a specimen having the following properties:

Tensile strength—17,800 p.s.i.
Modulus of elasticity—2,120,000 p.s.i.
Specific tensile strength—292,000 p.s.i.
Specific modulus—34,900,000 p.s.i.

The above data show that although omission of the coupler-treatment resulted in lower values than those obtained in Example 1 from a combination of silane-innerlayer-outerlayer treatments, such omission does not decrease the values so much as does eliminating the innerlayer while including the silane-treatment, as in the last run of Example 1.

EXAMPLE 4

This example shows use of silicon carbide whiskers (Carborundum Company).

The whiskers were treated with γ-aminopropyltriethoxysilane as in Example 1, dispersed ultrasonically in acetone, and then reacted with the innerlayer resin solution as in Example 1 except that after addition of the triethylenetetramine, the reaction mixture was warmed at 60° C. for 3 hours instead of being refluxed for 2 hours as in that example. The innerlayer-coated product thus obtained was then treated with the protomatrix resin solution of Example 1, employing the procedure therein described for treatment of the innerlayer-coated glass fiber. Molding of the dried product thus obtained at about 150° C. and 1240 p.s.i. gave a hard, smooth composite having a tensile strength of 31,800 p.s.i. and a tensile modulus of 2,330,000 p.s.i.

EXAMPLE 5

This example shows use of silicon nitride whiskers.

A solution of flexible resin was prepared as follows: To a solvent consisting of about 98% by weight of acetone and 2% by weight of 2-butanone there were added 2 g. of EM-207 flexibilizer, 2 g. of Epon 815 epoxide resin and 0.5 g. of triethylenetetramine, thereby giving a concentration of 0.02 g. resin components per gram of solution. A coating of flexible resin was deposited upon the whiskers directly by dropwise addition of 20 g. of said solution of flexible resin to about 7 g. of the dry whiskers, while tossing the whiskers around with a spatula as the solution was being added. Ash determination of the resulting coated whiskers gave 93.8% ash. To 6.7 g. of these coated whiskers there were added, dropwise, 48.2 g. of the protomatrix resin described in Example 1, except that the solution employed here had been diluted to 5%. During addition of the solution, the whiskers were constantly stirred. Owing to the very large surface area of the whiskers, all of the liquid was absorbed by the whisker mass, and after drying in vacuum for 20 hours at room temperature, ignition showed the ash content to be 71.5%. Molding of the thus-coated whiskers was conducted in a 1.5" x 0.5" x 0.04" mold, using a fluorocarbon release agent, with an initial temperature of 30° C. and an initial gage pressure of 40 p.s.i., gradually increasing to 154° C. and 240 p.s.i. within about 20 minutes, and allowing to cool to 40° C. without releasing pressure. Curing was then conducted by heating at 152° C. for 2 hours, allowing to cool to 70° C., and completing the cure at 80° C. for 2 hours. The molded piece thus obtained was hard and well-dimensioned.

EXAMPLE 6

This example describes preparation of a granular molding composition wherein the filler consists of microbeads of glass. The beads (Cataphote Corporation Type 4000), having an average diameter of 0.001" and ranging in diameter from 0.0005" to 0.0015", were stirred in either a 1% aqueous solution of γ-glycidoxypropyltriethoxysilane (Y-4087) or γ-aminopropyltriethoxysilane (A-1100) in a ratio of 1 ml. of the solution per gram of beads at room temperature for 30 minutes. The beads were removed from the solutions and oven-dried at 140° C. for an hour.

An innerlayer coating was formed on the thus-treated beads by stirring 100 g. of beads obtained from each type of silane treatment in respective, refluxing solutions which each had the following composition: 6.25 g. Epon 815, 6.25, g. EM-207 and 250 ml. of a solvent consisting of 7.6% water, 67.2% methanol and 25.2% acetone. After one hour, 1.8 g. triethylenetetramine was added to each mixture, and the refluxing was continued for two hours longer. The coated beads were separated from the reaction mixtures by filtration and dried at 70° C. for 15 hours.

Each batch of coated beads thus obtained was dispersed ultrasonically in a viscous solution of Epon-815 and triethylenetetramine in a 7:1 weight ratio to obtain thorough contact with the resin constituents. Drying overnight at about 70° C. gave a loose mass of particles wherein substantially each microbead was encased first in the flexibilized B-stage resin and then in the rigid B-stage resin. Compression molding and curing substantially as in Example 1 gave smooth molded pieces having the following properties.

| Silane used | Tensile strength, p.s.i. | Modulus of elasticity, p.s.i. | Elongation, percent |
| --- | --- | --- | --- |
| A-1100 | 11,700 | 865,000 | 3.2 |
| Y-4087 | 12,000 | 875,000 | 3.0 |

The above values, compared to those obtained in Example 7, show that in order to obtain high tensile strength in the bead-filled composite, the outerlayer resin is more advantageously deposited from a solution of the protomatrix resin rather than from a mixture of the liquid resin and hardener therefor, as in the present example. However, it will be noted that the tensile strengths obtained by the process of this example are greater than the 8,700 p.s.i. value obtained in the second product of Example 7 by omitting the innerlayer of flexible resin.

EXAMPLE 7

The glass beads which were described in Example 6 were treated with the silane coupler γ-aminopropyltriethoxysilane substantially as described in Example 1 for treatment of glass fiber.

The silane-treated beads thus obtained were coated with an inner layer of flexible resin by refluxing them in a resin solution wherein the solvent consisted of 67% methanol, 25% acetone and 8% water by weight, the resin constituents consisted of EM-207, Epon 815 and triethylenetetramine in a 4:4:1 weight ratio, and the total solids present amounted to 10% by weight of the solution. Refluxing was continued for two hours, the resulting coated beads were separated from the solution by filtration, and rinsed with acetone. A slurry of the coated beads was then treated with the proto-matrix solution described in Example 1, employing substantially the procedure used in that example with the glass fibers. There were thus obtained hard, discrete, spherical granules consisting essentially of individual glass beads each enveloped in a first coaoting of the flexibilized resin and a second, outer coating of the more rigid resin. The resin of both layers was in a hard, but incompletely cured stage.

Molding of the granules as in Example 1 gave a hard, smooth composite having a flexural strength of 19,900 p.s.i. and a flexural modulus of 1,500,000. The composite had a glass content of 50.0% by weight, as determined by ignition.

Studies of the tensile fracture surface of the above composite, employing the scanning electron microscope, showed the fracture to be displaced away from the glass beads without exposing them. This indicates strong interaction between reinforcement and matrix and is typical of the well-bonded system. The farcture surfaces also exhibited many large and small secondary fractures or cracks in the matrix, which are not present when a weak interfacial bond exists.

In order to ascertain the value of the innerlayer, the above experiment was repeated except that instead of first treating the silane-coated microbeads with the solution of innerlayer resin, said beads were used directly for deposition of the outerlayer resin; i.e., they were treated of resin, was then compression molded as in Example 1. The dry, granulated product thus otbained, containing only the one coating of resin and no flexible innerlayer of resin, was then compression molded as in Example 1. The resulting composite was found to have a flexural strength of 8,700 p.s.i. and a flexural modulus of 1,000,000 p.s.i.

It is to be understood that although the invention has been described with specific reference to particular embodiments thereof, it is not to be so limited since changes and alterations therein may be made which are within the full intended scope of this invention as defined by the appended claims.

What we claim is:

1. A shaped composite structure consisting essentially of an epoxy resin matrix and, distributed in said matrix, noncontinuous, inorganic reinforcing fiber having an aspect ratio of about 50 to 1500, said matrix comprising a layer of a first epoxy resin composition enveloping the fiber and a second epoxy resin integral with the first resin composition, the modulus of elasticity of the first resin composition being from about 20% to 80% of the second epoxy resin.

2. The product defined in claim 1, further limited in that the said first resin composition is an epoxide resin flexibilized with a saturated polyester.

3. The product defined in claim 1, further limited in that the reinforcing fibers particles are glass fibers.

4. The product defined in claim 1, further limited in that the reinforcing filler particles are silicon carbide whiskers.

5. The product defined in claim 1, further limited in that the reinforcing fibers particles are silicon nitride whiskers.

6. A granular molding composition comprising (I) noncontinuous inorganic reinforcing fiber having an aspect ratio of from about 50 to 1500 and enveloped in a first solid, thermosettable epoxy resin and (II) a second solid, thermosettable epoxy resin surrounding the enveloped fiber and integral with the first resin composition, said first resin having a modulus of elasticity, in the completely cured state, which is from 20% to 80% of the second resin in the completely cured state.

7. The composition defined in claim 6, further limited in that the fiber is silicon carbide whisker.

8. The composition defined in claim 6, further limited in that the fiber is silicon nitride whisker.

9. The composition defined in claim 6, further limited in that the low-modulus resin composition is an epoxide resin flexibilized with a saturated polyester.

10. The composition defined in claim 6, further limited in that the reinforcing fibers are glass fibers.

11. The process of preparing a solid, curable molding composition which comprises depositing on the surface of noncontinuous, inorganic, reinforcing fiber, having an aspect ratio of about 50 to 1500, a first thermosettable epoxy resin composition to envelope the fiber with said first composition, and depositing upon the thus enveloped fiber a second, solid thermosettable epoxy resin, said first resin having, in the completely cured state, a modulus of elasticity which is from about 20% to 80% of the second resin in the completely cured state.

12. The process defined in claim 11, further limited in that said first resin composition is deposited by stirring said fiber with a solution of an A-stage epoxy resin in a solvent therefor which is a nonsolvent for said resin in its partially cured, solid state and which provides a hydrogen donor, adding to the stirred solution a curing agent for said A-stage resin, continuing the stirring to advance the A-stage resin to the solid, thermosettable state, and separating the solids from the resulting reaction mixture.

13. The process defined in claim 11, further limited in that said second thermosettable resin is deposited by mixing the enveloped fibers with a solution of said second resin and gradually adding the resulting mixture, with stirring, to a liquid which is a nonsolvent for the resin and is miscible with the solvent of said solution.

14. The process of preparing a solid, curable molding composition which comprises (A) stirring a plurality of noncontinuous, inorganic reinforcing fibers with a solution of a resinous composition comprising a liquid epoxide resin and a saturated polyester as a flexibilizer therefor in a solvent consisting essentially of water, a lower alkanol and a lower aliphatic ketone, said solvent being incapable of dissolving the resin in its solid, partially cured state;

(B) adding to the stirred solution a curing agent for the liquid epoxide resin and continuing the stirring to advance the liquid resin to the solid, thermosettable state while forming a deposit of the said solid resin on the fiber surfaces to completely envelope the fibers;

(C) separating the enveloped fibers from the resulting reaction mixture;

(D) mixing said enveloped fibers with a dilute solution of a solid, fusible epoxide;

(E) adding the mixture obtained in (D) to water containing a polyelectrolyte suspending agent to precipitate a solid, fusible epoxide upon the enveloped fibers;

(F) removing the liquid phase from the precipitated mixture obtained in (E) to recover the solid, curable molding composition.

References Cited

UNITED STATES PATENTS

| | | | |
|---|---|---|---|
| 2,810,674 | 10/1957 | Madden | 260—831 X |
| 2,952,192 | 9/1960 | Nagin. | |
| 2,999,833 | 9/1961 | Bleuenstein | 260—38 |
| 3,006,875 | 10/1961 | Liberthson et al. | 260—38 X |
| 3,080,256 | 3/1963 | Bundy | 260—37 X |
| 3,171,827 | 2/1965 | De Vries et al. | 260—40 |
| 3,288,618 | 11/1966 | De Vries. | |

ALLAN LIEBERMAN, Primary Examiner

L. T. JACOBS, Assistant Examiner

U.S. Cl. X.R.

260—38

PO-1050
(5/69)

UNITED STATES PATENT OFFICE
CERTIFICATE OF CORRECTION

Patent No. 3,518,221          Dated June 30, 1970

Inventor(s) Allen S. Kenyon et al

It is certified that error appears in the above-identified patent and that said Letters Patent are hereby corrected as shown below:

Column 2, line 19, "preprges" should be -- prepregs --.

Column 2, line 21, "0.0000.1"" should be -- 0.00001" --.

Column 2, line 39, "propenisty" should be -- propensity --.

Column 4, line 27, "with a solution of the curable, more rigid resin," should be deleted and insert -- the residual liquid is removed and the particles, --.

Column 6, line 44, "and difference" should be -- any difference --.

Column 6, line 71, "nonfilter" should be -- nonfiller --.

Column 9, line 27, "synetheic" should be -- synthetic --.

Column 10, line 43, "not critical" should be -- no critical --.

Column 11, line 27, "reduced variables" should be -- reduce variables --.

Column 11, line 67, "alternately," should be -- Alternatively, --.

Column 12, line 73, "249.0 g. Epon" should be -- 249.0 g. Epon-826 --.

Column 14, line 19, "contriubes" should be -- contributes --.

Column 14, line 21, "micrograps" should be -- micrographs --.

Page 2

UNITED STATES PATENT OFFICE
CERTIFICATE OF CORRECTION

Patent No. 3,518,221      Dated June 30, 1970

Inventor(s) Allen S. Kenyon et al      PAGE - 2

It is certified that error appears in the above-identified patent and that said Letters Patent are hereby corrected as shown below:

Column 15, between lines 6 and 7, should be inserted -- Elongation - 120 % --.

Column 16, line 63, "coaoting" should be -- coating --.

Column 17, line 2, "farcture" should be -- fracture --.

Column 17, line 11, "of resin, was then compression molded as in Example 1." should be deleted and insert -- with the dilute protomatrix resin solution of Example 1. --.

Claim 3, line 2, "fibers particles are" should be -- fibers are --.

Claim 4, line 2 "reinforcing filler particles are" should be -- reinforcing fibers are --.

Claim 5, line 2, "reinforcing fibers particles are" should be -- reinforcing fibers are --.

Signed and sealed this 14th day of September 1971.

(SEAL)
Attest:

EDWARD M. FLETCHER, JR.
Attesting Officer

ROBERT GOTTSCHALK
Acting Commissioner of Patents